(12) United States Patent
Mittelsteadt et al.

(10) Patent No.: US 9,537,169 B2
(45) Date of Patent: *Jan. 3, 2017

(54) ELECTROCHEMICAL DEVICE COMPRISING COMPOSITE BIPOLAR PLATE AND METHOD OF USING THE SAME

(71) Applicant: Giner, Inc., Newton, MA (US)

(72) Inventors: Cortney K. Mittelsteadt, Wayland, MA (US); William A. Braff, Somerville, MA (US)

(73) Assignee: GINER, INC., Newton, MA (US)

( * ) Notice: Subject to any disclaimer, the term of this patent is extended or adjusted under 35 U.S.C. 154(b) by 338 days.

This patent is subject to a terminal disclaimer.

(21) Appl. No.: 13/974,172

(22) Filed: Aug. 23, 2013

(65) Prior Publication Data

US 2014/0065510 A1 Mar. 6, 2014

Related U.S. Application Data

(63) Continuation of application No. 12/317,068, filed on Dec. 17, 2008, now Pat. No. 8,551,670.
(Continued)

(51) Int. Cl.
*H01M 8/1004* (2016.01)
*H01M 8/0204* (2016.01)
(Continued)

(52) U.S. Cl.
CPC .............. *H01M 8/1006* (2013.01); *C25B 9/00* (2013.01); *C25B 9/10* (2013.01); *H01M 8/0204* (2013.01);
(Continued)

(58) Field of Classification Search
CPC .. H01M 8/1002; H01M 8/1023; H01M 8/241; H01M 10/0418; H01M 10/044; H01M 2008/1095; H01M 8/0204; H01M 8/0213; H01M 8/0228; H01M 8/1004
See application file for complete search history.

(56) References Cited

U.S. PATENT DOCUMENTS 4,619,753 A 10/1986 Christen et al.
5,800,796 A 9/1998 Webb et al.
(Continued)

OTHER PUBLICATIONS de Heer et al., "Aligned Carbon Nanotube Films: Production and Optical and Electronic Properties," Science, 268: 845-847 (1995).

*Primary Examiner* — Ula C Ruddock
*Assistant Examiner* — Thomas Parsons
(74) *Attorney, Agent, or Firm* — Kriegsman & Kriegsman

(57) ABSTRACT

An electrochemical device and methods of using the same. In one embodiment, the electrochemical device may be used as a fuel cell and/or as an electrolyzer and includes a membrane electrode assembly (MEA), an anodic gas diffusion medium in contact with the anode of the MEA, a cathodic gas diffusion medium in contact with the cathode, a first bipolar plate in contact with the anodic gas diffusion medium, and a second bipolar plate in contact with the cathodic gas diffusion medium. Each of the bipolar plates includes an electrically-conductive, chemically-inert, non-porous, liquid-permeable, substantially gas-impermeable membrane in contact with its respective gas diffusion medium, as well as a fluid chamber and a non-porous an electrically-conductive plate.

46 Claims, 7 Drawing Sheets

Related U.S. Application Data

(60) Provisional application No. 61/008,245, filed on Dec. 17, 2007.

(51) Int. Cl.
| | |
|---|---|
| *H01M 8/0228* | (2016.01) |
| *H01M 8/0213* | (2016.01) |
| *H01M 8/10* | (2016.01) |
| *C25B 9/10* | (2006.01) |
| *H01M 8/02* | (2016.01) |
| *H01M 8/04* | (2016.01) |
| *H01M 8/18* | (2006.01) |
| *C25B 9/00* | (2006.01) |

(52) U.S. Cl.
CPC ....... *H01M 8/04186* (2013.01); *H01M 8/1011* (2013.01); *H01M 8/186* (2013.01); *Y02E 60/523* (2013.01); *Y02E 60/528* (2013.01)

(56) References Cited

U.S. PATENT DOCUMENTS

| | | | |
|---|---|---|---|
| 6,080,503 A | 6/2000 | Schmid et al. | |
| 6,379,827 B1 | 4/2002 | Cipollini | |
| 6,548,199 B1 | 4/2003 | Tanaka et al. | |
| 6,558,824 B1 | 5/2003 | Muchnic et al. | |
| 7,220,513 B2 | 5/2007 | Rohwer et al. | |
| 8,551,670 B2 * | 10/2013 | Mittelsteadt et al. | 429/483 |
| 2005/0221141 A1 | 10/2005 | Hampden-Smith et al. | |
| 2005/0233203 A1 | 10/2005 | Hampden-Smith et al. | |
| 2008/0090108 A1 | 4/2008 | Uchida et al. | |
| 2012/0237848 A1 | 9/2012 | Mittelsteadt et al. | |

\* cited by examiner

Comparison of performance of liquid and vapor-fed direct methanol fuel cells. In the vapor-fed cell loss of methanol to the cathode is greatly reduced.

ID_DEVICE
COMPRISING COMPOSITE BIPOLAR
PLATE AND METHOD OF USING THE
SAME

STATEMENT REGARDING FEDERALLY
SPONSORED RESEARCH OR DEVELOPMENT

The U.S. Government has a paid-up license in this invention and the right in limited circumstances to require the patent owner to license others on reasonable terms as provided for by the terms of Grant No. NN07QA32P awarded by NASA.

BACKGROUND OF THE INVENTION

The present invention relates generally to electrochemical devices and relates more particularly to electrochemical devices of the type comprising a solid proton exchange membrane.

Electrochemical devices of the type comprising a solid polymer electrolyte membrane (PEM) are well-known, such electrochemical devices finding applications as, for example, fuel cells, electrolyzers, sensors, gas concentrators, gas compressors, supercapacitors, ultracapacitors and industrial electrochemical process units. A common type of solid polymer electrolyte membrane that is used in electrochemical devices consists of a homogeneous perfluorosulfonic acid (PFSA) polymer, said PFSA polymer being formed by the copolymerization of tetrafluoroethylene and perfluorovinylether sulfonic acid. Such polymers are good conductors of ions but poor conductors of electrons. See e.g., U.S. Pat. No. 3,282,875, inventors Connolly et al., issued Nov. 1, 1966; U.S. Pat. No. 4,470,889, inventors Ezzell et al., issued Sep. 11, 1984; U.S. Pat. No. 4,478,695, inventors Ezzell et al., issued Oct. 23, 1984; U.S. Pat. No. 6,492,431, inventor Cisar, issued Dec. 10, 2002, all of which are incorporated herein by reference. A commercial embodiment of a perfluorosulfonic acid polymer PEM is available from DuPont (Wilmington, Del.) as NAFION® PFSA polymer.

Typically, the solid polymer electrolyte membrane is sandwiched between a pair of electrodes at the membrane interfaces on which desired electrochemical reactions take place, one of the electrodes functioning as an anode and the other of the electrodes functioning as a cathode. A first catalyst layer is typically positioned between the anode and the membrane, and a second catalyst layer is typically positioned between the cathode and the membrane, the catalyst layers either being formed as part of the electrodes or being applied to the solid polymer electrolyte membrane. The combination of the membrane, the catalysts and the electrodes is commonly referred to in the art as a membrane electrode assembly (MEA).

Where the electrochemical cell is used as a fuel cell to generate electricity, a fuel is supplied to the anode, and an oxidizing agent is supplied to the cathode. The electrodes are connected electrically to a load, such as an electronic circuit, by an external circuit conductor. Oxidation of the fuel at the anode produces electrons that flow through the external circuit to the cathode producing an electric current. The electrons react with an oxidant at the cathode. In theory, any substance capable of chemical oxidation that can be supplied continuously to the anode can serve as the fuel for the fuel cell, and any material that can be reduced at a sufficient rate at the cathode can serve as the oxidant for the fuel cell.

In one well-known type of fuel cell, sometimes referred to as a hydrogen fuel cell, gaseous hydrogen serves as the fuel, and gaseous oxygen serves as the oxidant. (In another well-known type of fuel cell, sometimes referred to as a direct methanol fuel cell, liquid methanol or an aqueous solution of methanol is used instead of hydrogen as the fuel.) The electrodes in a hydrogen fuel cell are typically porous to permit the gas-electrolyte junction to be as great as possible. At the anode, incoming hydrogen gas ionizes to produce hydrogen ions and electrons. Since the electrolyte is a non-electronic conductor, the electrons flow away from the anode via the external circuit, producing an electric current. At the cathode, oxygen gas, either from a pure supply or from air, reacts with hydrogen ions migrating through the electrolyte and the incoming electrons from the external circuit to produce water as a byproduct. The overall reaction that takes place in the fuel cell is the sum of the anode and cathode reactions, with part of the free energy of reaction being released directly as electrical energy and with another part of the free energy being released as heat at the fuel cell. Often, a number of fuel cells are assembled together in order to meet desired voltage and current requirements. One common type of assembly, often referred to as a bipolar stack, comprises a plurality of stacked fuel cells that are electrically connected in series in a bipolar configuration.

An electrolyzer is similar in structure to a fuel cell but functions essentially in reverse to a fuel cell. Consequently, in the case of a water electrolyzer, water and electricity are provided, and molecular hydrogen and molecular oxygen are produced. In another common type of electrolyzer, water and sulfur dioxide are provided, and sulfuric acid and hydrogen gas are produced.

Most fuel cells are run using a finite quantity of fuel, the fuel typically being withdrawn from a storage vessel as needed. For example, in the case of a hydrogen fuel cell, hydrogen gas is typically stored in and withdrawn from a hydrogen storage tank. As can be appreciated, if fuel is withdrawn from a storage vessel, and the fuel is not replenished thereafter in some manner, then eventually there will be no fuel left for the fuel cell to operate. A regenerative fuel cell system addresses this problem by including equipment that may be used to regenerate fuel for the fuel cell. For example, in the case of a hydrogen fuel cell system, the equipment for regenerating fuel may include an electrolyzer that is run to convert water into oxygen gas and hydrogen gas. The electrolyzer may be operated using solar, wind or geothermal energy so as not to deplete the electrical energy produced by operation of the fuel cell. In this manner, a regenerative fuel cell system may be used in a fashion similar to a rechargeable battery, with the electrolyzer being run to store energy and with the fuel cell being run to generate electrical current. A regenerative fuel cell system may include separate electrolyzer and fuel cell units or may include a bifunctional unit that may be alternately operated either as an electrolyzer or as a fuel cell. In those instances in which a bifunctional unit is used, the system is typically referred to as a unitized regenerative fuel cell system. Regenerative fuel cell systems may be either closed-loop, in which case the quantities of fuel, oxidant and products are limited, or open-loop, in which case the quantities are unlimited.

Additional background information relating to regenerative fuel cell systems may be found, for example, in the following patents and publications, all of which are incorporated herein by reference: U.S. Pat. No. 6,887,601 B2, inventors Moulthrop, Jr. et al., issued May 3, 2005; U.S. Pat. No. 6,838,205 B2, inventors Cisar et al., issued Jan. 4, 2005; U.S. Pat. No. 6,833,207 B2, inventors Joos et al., issued Dec. 21, 2004; U.S. Pat. No. 3,981,745, inventor Stedman, issued Sep. 21, 1976; Giner et al., "Fuel Cells As Rechargeable Batteries," *Proceedings NATO-ARW, Kiev* 5/95 (Kluwer, Dordrecht, 1/96) pp. 215-232; Burke, "High Energy Density Regenerative Fuel Cell Systems for Terrestrial Applications," *IEEE AES Systems Magazine,* 23-34 (1999); and Ioroi et al., "Thin film electrocatalyst layer for unitized regenerative polymer electrolyte fuel cells," *Journal of Power Sources,* 112:583-7 (2002).

Problems that are commonly encountered in electrochemical cells of the type comprising solid polymer electrolyte membranes include the removal of products from the membrane electrode assembly or the continued supply of reactants to the membrane electrode assembly. For example, in the case of a hydrogen fuel cell, water tends to accumulate on the cathodic catalyst, where water is produced. This is problematic because the accumulated water often impedes the delivery of additional reactant gases to the catalyst. This is generally addressed by operating one or both of the feed gases at high excess stoichiometries and separating the product water. However, this approach is not always feasible, such as when the quantities of gases are limited or when the fuel cell is a dead-end fuel cell (i.e., a fuel cell having a gas inlet but no gas outlet). Also, in the case of a water electrolyzer, water is typically fed to the electrolyzer at either the oxygen or hydrogen electrode. This is typically done at a high stoichiometric ratio to cool the stack and to ensure the utilization of the entire surface area. The evolved product gas and excess water then need to be separated, often under high pressure, with recovery of the water.

In U.S. Pat. No. 4,729,932, inventor McElroy, which issued Mar. 8, 1988, and which is incorporated herein by reference, there is described a fuel cell comprised of individual fuel cells each having a barrier plate bounding the individual fuel cell, an anode chamber, a cathode chamber, a solid polymer electrolyte membrane having the cathode and anode intimately contacting opposite surfaces of the membrane and separating the anode and cathode chambers, and a gas/water separator which includes a porous hydrophilic structure associated with the cathode chamber and bounding the other side of the individual fuel cell. The porous hydrophilic structure is permeable to liquid but impermeable to gas flow at gas pressures below a "bubble pressure P" which is related to the pore size of the structure by the relationship $P=(2\times(\text{surface tension}))/(\text{pore radius for individual circular pores})$.

In U.S. Pat. No. 3,418,168, inventor Wentworth, which issued Dec. 24, 1968, and which is incorporated herein by reference, there is disclosed a microporous sheet for use as a wick in fuel cells, the microporous sheet being composed of a hydrophilic filler and a vinyl chloride/acrylonitrile copolymer.

In U.S. Pat. No. 6,171,720 B1, inventors Besmann et al., which issued Jan. 9, 2001, and which is incorporated herein by reference, there is disclosed a combination bipolar plate/ diffuser fuel cell component. The component includes an electrically conducting solid material having a porous region having a porous surface; and a hermetic region, the hermetic region defining at least a portion of at least one coolant channel, the porous region defining at least a portion of at least one reactant channel, the porous region defining a flow field medium for diffusing the reactant to the porous surface.

Other patents of interest include the following, all of which are incorporated herein by reference: U.S. Pat. No. 6,811,905 B1, inventors Cropley et al., which issued Nov. 2, 2004; U.S. Pat. No. 6,808,838 B1, inventor Wilson, which issued Oct. 26, 2004; U.S. Pat. No. 4,678,724, inventor McElroy, which issued Jul. 7, 1987; and U.S. Pat. No. 4,543,303, inventors Dantowitz et al., which issued Sep. 24, 1985.

SUMMARY OF THE INVENTION

It is an object of the present invention to provide a novel electrochemical device.

According to one aspect of the invention, there is provided an electrochemical device that comprises (a) a polymer electrolyte membrane, said polymer electrolyte membrane having opposing first and second faces; (b) an anode electrically coupled to the first face of said polymer electrolyte membrane; (c) a cathode electrically coupled to the second face of said polymer electrolyte membrane; (d) an anodic gas diffusion medium defining an anode chamber in fluid communication with said anode; (e) a cathodic gas diffusion medium defining a cathode chamber in fluid communication with said cathode; and (f) a first electrically-conductive, chemically-inert, non-porous, liquid-permeable, substantially gas-impermeable membrane in contact with said anodic gas diffusion medium.

According to another aspect of the invention, there is provided an electrochemical device that comprises (a) a polymer electrolyte membrane, said polymer electrolyte membrane having opposing first and second faces; (b) an anode electrically coupled to the first face of said polymer electrolyte membrane; (c) a cathode electrically coupled to the second face of said polymer electrolyte membrane; (d) an anodic gas diffusion medium defining an anode chamber in fluid communication with said anode; (e) a cathodic gas diffusion medium defining a cathode chamber in fluid communication with said cathode; and (f) a first electrically-conductive, chemically-inert, non-porous, liquid-permeable, substantially gas-impermeable membrane in contact with said cathodic gas diffusion medium.

The present invention is also directed at methods of using the above-described electrochemical device.

For purposes of the present specification and claims, it is to be understood that certain relational terms used herein, such as "on," "over," and "in front of," when used to denote the relative positions of two or more components of an electrochemical cell are used to denote such relative positions in a particular orientation and that, in a different orientation, the relationship of said components may be reversed or otherwise altered.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

The present invention is based, at least in part, on the discovery that the delivery of reactants to and/or the removal of products from the membrane electrode assembly of an electrochemical device may be facilitated by the placement in the device of an electrically-conductive membrane that is selectively permeable to a desired reactant or product. Such a membrane may be used, for example, in a hydrogen fuel cell to selectively withdraw product water, but not reactant oxygen, from the cathodic gas diffusion medium and may be used, for example, in a water electrolyzer to feed water in vapor form to the anodic gas diffusion medium. Additional applications and advantages are discussed below.

Figure 1:
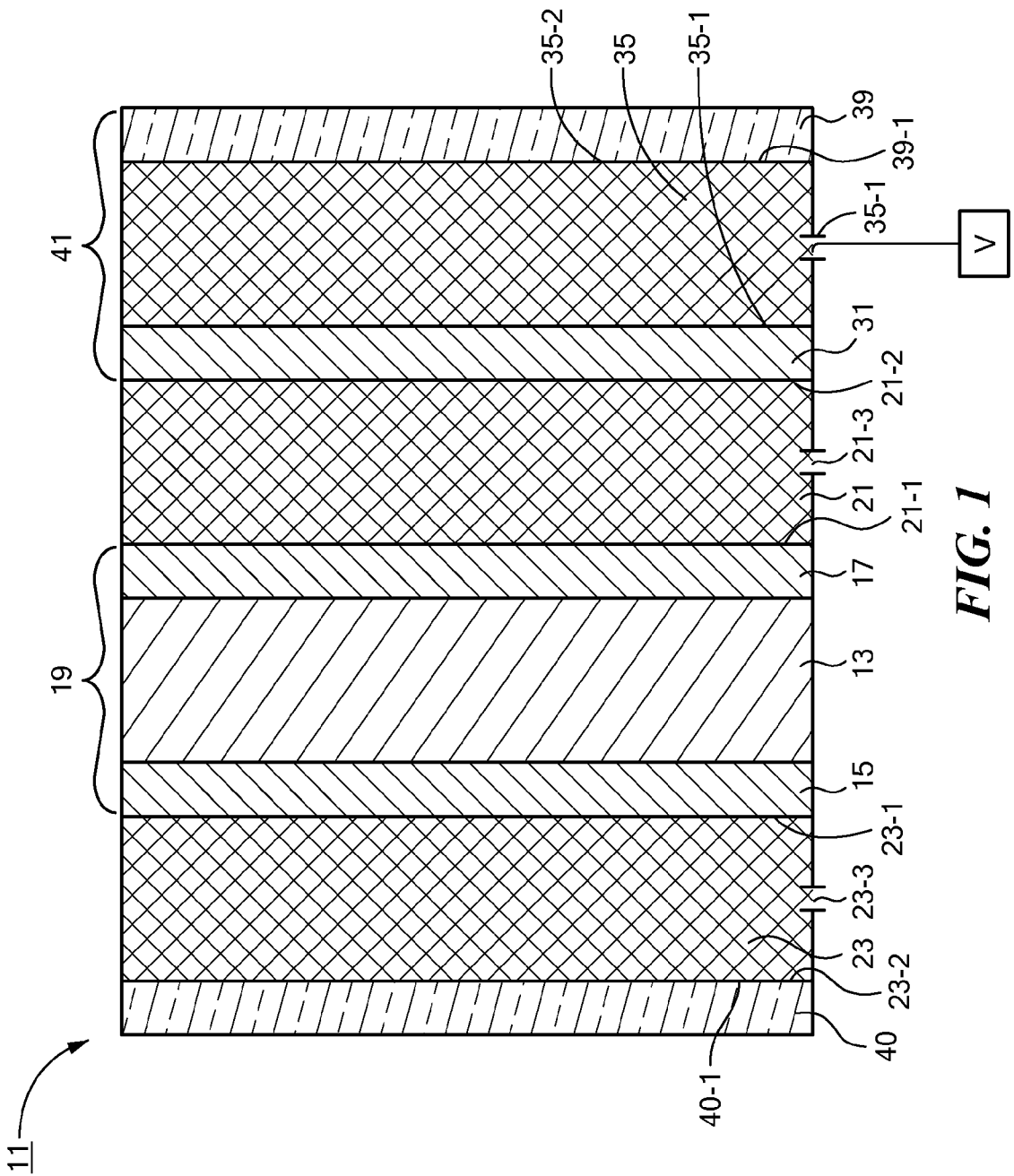
FIG. 1 is a schematic section view of a first embodiment of an electrochemical device constructed according to the teachings of the present invention.

Referring now to FIG. 1, there is schematically shown a section view of a first embodiment of an electrochemical device constructed according to the teachings of the present invention, the electrochemical device being represented generally by reference numeral 11. (For simplicity and clarity, certain standard components of electrochemical device 11, such as electrical leads, cell frames, etc., are not shown or described herein.)

Electrochemical device 11, which is particularly well-suited for use as a hydrogen fuel cell, may comprise a solid polymer electrolyte membrane 13, an anode 15 positioned in contact with and along one face of proton exchange membrane 13, and a cathode 17 positioned in contact with and along the other face of proton exchange membrane 13. A suitable catalyst (not shown) may be positioned at the interface between anode 15 and proton exchange membrane 13, and a suitable catalyst (not shown) may be positioned at the interface between cathode 17 and proton exchange membrane 13. Solid polymer electrolyte membrane 13, anode 15, and cathode 17, together with the two aforementioned catalysts, may collectively constitute a membrane electrode assembly 19. Membrane electrode assembly 19 may be conventional in structure and composition for a hydrogen fuel cell, but is not so limited.

Electrochemical device 11 may additionally comprise a pair of gas diffusion media 21 and 23, gas diffusion medium 21 having one face 21-1 in contact with cathode 17 and an opposite face 21-2 facing away from cathode 17, gas diffusion medium 23 having one face 23-1 in contact with anode 15 and an opposite face 23-2 facing away from anode 15. Gas diffusion media 21 and 23 are preferably mechanically stable, electrically-conductive, chemically-inert, porous materials. Materials suitable for use as gas diffusion media 21 and 23 may include, but are not limited to, conventional gas diffusion electrode materials, such as, but not limited to, carbon fiber papers, carbon cloths, metal meshes, metal-coated polymer meshes, perforated metal sheets and sintered metal particle sheets. Gas diffusion media 21 and 23 may be coated, partially coated or impregnated with carbon, metallic, metal oxide or polymeric substances (e.g., fibers or particles) to enhance their electrical properties and/or to modify their hydrophobicities.

Electrochemical device 11 may further include an electrically-conductive, chemically-inert, non-porous, liquid-permeable, substantially gas-impermeable membrane 31 in contact with and along face 21-2 of gas diffusion medium 21. Membrane 31 may comprise, for example, a solid polymer electrolyte into which electrically-conductive particles are dispersed. Examples of suitable materials for use as the solid polymer electrolyte include (i) polymer compositions that contain metal salts; (ii) polymeric gels that contain electrolytes; and (iii) ion exchange resins. More specifically, the solid polymer electrolyte may be, for example, a cation exchange ionomer membrane where the cation exchange group may be, but is not limited to, $—SO_3^-$, $—SO_2NH^+$, $—PO_3^{2-}$, or $—CO_2^-$ or may be, for example, an anion exchange ionomer membrane where the anion exchange group may be, but is not limited to, $—NH_2^+$. A preferred material for use as the solid polymer electrolyte is a perfluorosulfonic acid (PFSA) membrane, such as is commercially available from DuPont (Wilmington, Del.) as NAFION® PFSA polymer. Examples of other materials that may be used in place of NAFION® PFSA are disclosed in U.S. Patent Application Publication No. US 2006/0183011 A1, inventors Mittelsteadt et al., which was published Aug. 17, 2006, and which is incorporated herein by reference. The electrically-conductive particles may be, but are not limited to, carbon black, metal particles and supported metal particles. The electrically-conductive particles should be selected so to be chemically-inert with materials that may come into contact with membrane 31. Consequently, for example, where membrane 31 is likely to come into contact with oxygen gas, one may wish not to use carbon black since carbon black is reactive with oxygen. Instead, one may wish to use particles of metals that are chemically-inert to oxygen gas, such as, for example, niobium, platinum, and titanium. Membrane 31 may be prepared by adding the electrically-conductive particles to the ionomer while the ionomer is in suspension form and then drying the suspension.

Electrochemical device 11 may further include a fluid chamber 35. Chamber 35, which may be made of a metal screen, a carbon fiber paper or any other electrically-conductive, chemically-inert structure capable of receiving fluid and defining a cavity, has a first face 35-1 positioned in contact with and along one side 31-1 of membrane 31.

Electrochemical device 11 may further include a pair of non-porous, electrically-conductive, chemically-inert sheets 39 and 40. Sheet 39 has a first face 39-1 positioned in contact with and along a second face 35-2 of chamber 35. In this manner, sheet 39 may serve to limit the axial flow of fluid through device 11. Sheet 40 has a first face 40-1 positioned in contact with and along a second face 23-2 of gas diffusion medium 23. In this manner, sheet 40 may serve to limit the axial flow of fluid through device 11.

Membrane 31, fluid chamber 35, and sheet 39 may be regarded collectively as a bipolar plate 41.

Although only one electrochemical cell is shown in device 11, it can readily be appreciated that a plurality of like cells could be arranged in a bipolar configuration. In this case, sheet 40 may be replaced with an additional bipolar plate 41.

Where, for example, electrochemical device 11 is to be used as a fuel cell, electrochemical device 11 may be used similarly in most respects to conventional fuel cells, with oxygen gas being delivered to gas diffusion medium 21 through a port 21-3 and with hydrogen gas being delivered to diffusion medium 23 through a port 23-3. However, in contrast to conventional fuel cells, a vacuum V may be applied to fluid chamber 35 across a port 35-1. In this manner, water that is produced at cathode 17 may be drawn out of diffusion medium 23 through membrane 31 and fluid chamber 35, thereby diminishing the flooding of cathode 17 with water. (The vacuuming of water also provides some evaporative cooling to electrochemical cell 11.) At the same time, because membrane 31 is substantially impermeable to gases, gas in diffusion medium 23 will not be drawn through membrane 31 and, instead, will be retained in diffusion medium 23.

Figure 2:
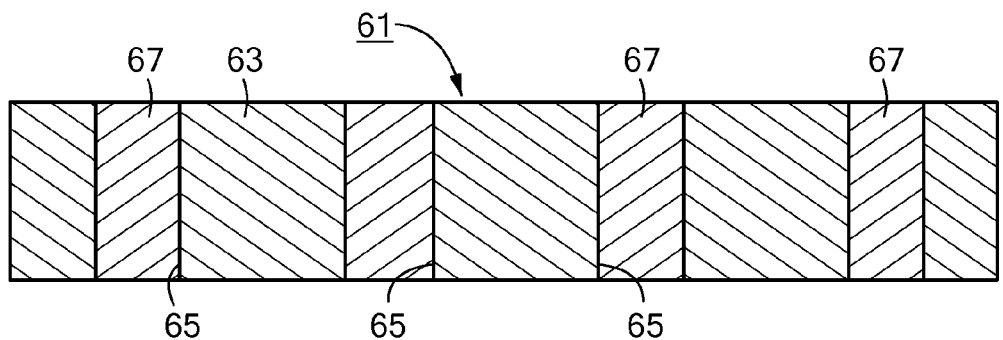
FIG. 2 is a schematic section view of a first alternate embodiment of the electrically-conductive, non-porous, liquid-permeable, substantially gas-impermeable membrane shown in FIG. 1.

Referring now to FIG. 2, there is schematically shown a section view of a first alternate embodiment to electrically-conductive, non-porous, liquid-permeable, substantially gas-impermeable membrane 31, said first alternate embodiment being represented generally by reference numeral 61.

Membrane 61, which may be used in place of membrane 31 in electrochemical device 11, may comprise a rigid, chemically-inert support 63 having a plurality of pores 65. Support 63 may be electrically-conductive and may be a metal sheet or a metallic sinter. Pores 65 may be formed in a metal sheet by drilling, e.g., mechanically, chemically or by photoetching. Alternatively, support 63 may be a porous polymer generated by inversion casting a solution of the polymer into a non-solvent or may be a polymeric plate with pores formed by drilling, e.g., mechanically, chemically or by photoetching. Pores 65 may be filled with an electrically-conductive, chemically-inert, non-porous, liquid-permeable, substantially gas-impermeable material 67, which may be identical in composition to membrane 31. (Alternatively, where support 63 is electrically-conductive, one may omit the electrically-conductive particles from material 67 if desired.)

Membrane 61 may be preferred over membrane 31 in cases where one wishes to have increased mechanical strength. The number, distribution, and dimensions of pores 65 may be varied depending upon the requirements for electrochemical device 11.

Figure 3:
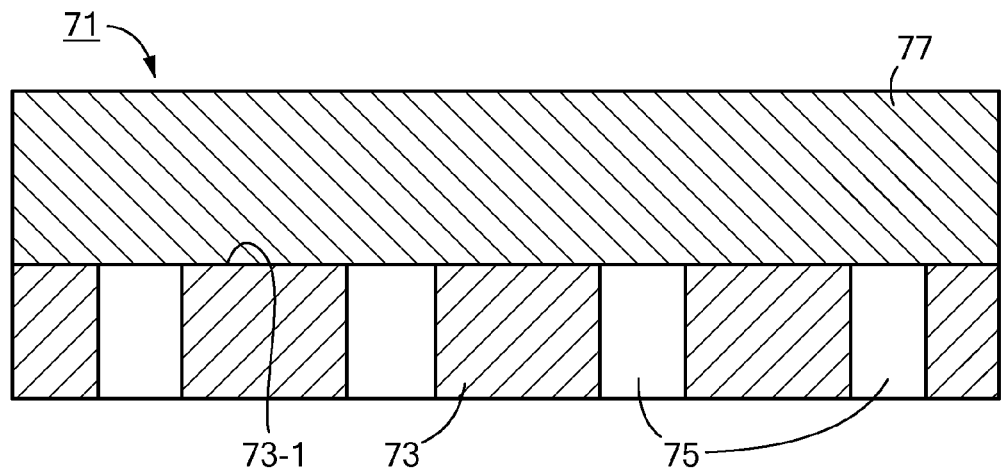
FIG. 3 is a schematic section view of a second alternate embodiment of the electrically-conductive, non-porous, liquid-permeable, substantially gas-impermeable membrane shown in FIG. 1.

Referring now to FIG. 3, there is schematically shown a section view of a second alternate embodiment to electrically-conductive, non-porous, liquid-permeable, substantially gas-impermeable membrane 31, said second alternate embodiment being represented generally by reference numeral 71.

Membrane 71, which may be used in place of membranes 31 and 61 in electrochemical device 11, may comprise a rigid, chemically-inert, electrically-conductive sheet 73 having a plurality of transverse pores 75. Sheet 73 may be a metal sheet. Membrane 71 may further comprise an electrically-conductive, chemically-inert, non-porous, liquid-permeable, substantially gas-impermeable sheet 77, which may be identical in composition to membrane 31. Sheet 77 may be positioned in contact with and along one face 73-1 of sheet 73.

Figure 4:
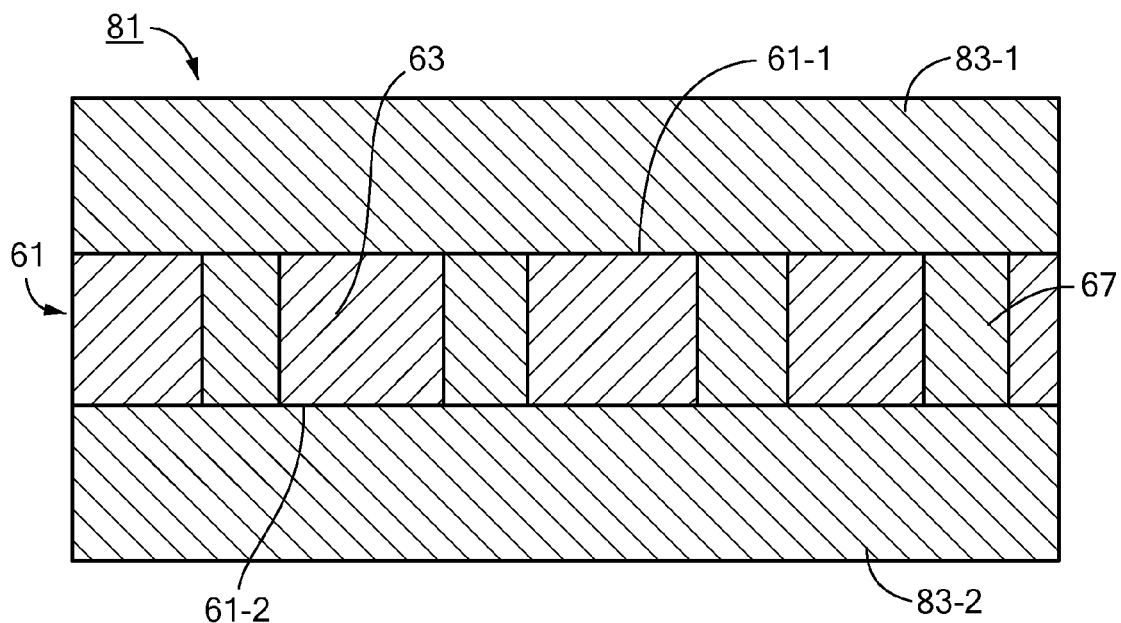
FIG. 4 is a schematic section view of a third alternate embodiment of the electrically-conductive, non-porous, liquid-permeable, substantially gas-impermeable membrane shown in FIG. 1.

Referring now to FIG. 4, there is schematically shown a section view of a third alternate embodiment to electrically-conductive, non-porous, liquid-permeable, substantially gas-impermeable membrane 31, said third alternate embodiment being represented generally by reference numeral 81.

Membrane 81, which may be used in place of membranes 31, 61 and 71 in electrochemical device 11, is similar in certain respects to membrane 61, the primary difference between membrane 81 and membrane 61 being that membrane 81 additionally comprises a pair of membranes 83-1 and 83-2, both of which may be identical to membrane 31, positioned in contact with and along opposite faces 61-1 and 61-2 of membrane 61. Where support 61 is electrically-conductive, one may omit, if desired, the electrically-conductive particles from the material 67 filling the pores.

Figure 5:
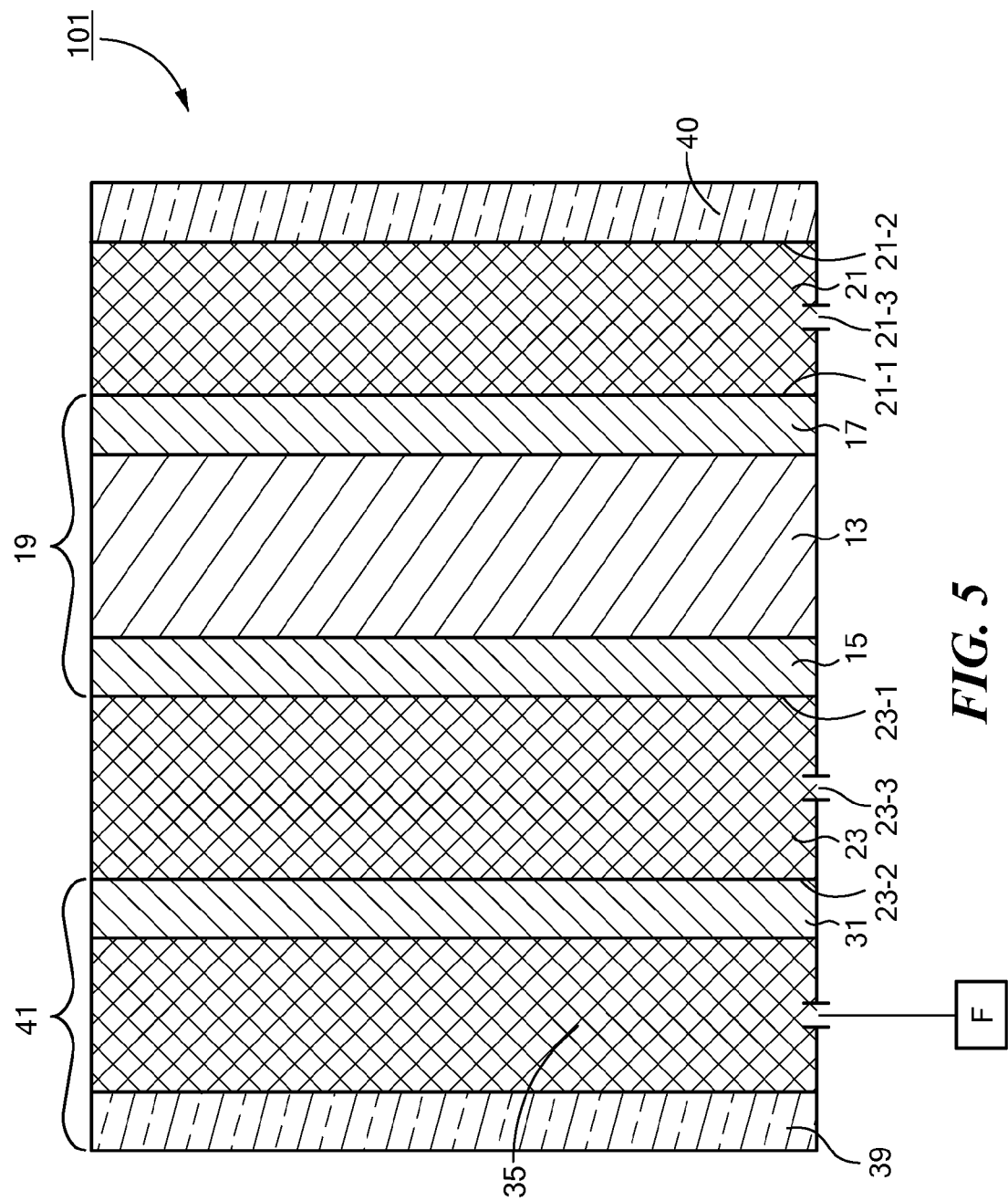
FIG. 5 is a schematic section view of a second embodiment of an electrochemical device constructed according to the teachings of the present invention.

Referring now to FIG. 5, there is schematically shown a section view of a second embodiment of an electrochemical device constructed according to the teachings of the present invention, the electrochemical device being represented generally by reference numeral 101.

Electrochemical device 101, which is particularly well-suited for use as a water electrolyzer (or as an $SO_2$ electrolyzer), may be similar in certain respects to electrochemical device 11. For example, similar to electrochemical device 11, electrochemical device 101 may comprise a membrane electrode assembly 19 that includes a polymer electrolyte membrane 13, an anode 15, and a cathode 17. In addition, similar to electrochemical device 11, electrochemical device 101 may comprise a gas diffusion medium 21 positioned in contact with and along cathode 17 and may comprise a gas diffusion medium 23 positioned in contact with and along anode 15. However, electrochemical device 101 differs primarily from electrochemical device 11 in that, in electrochemical device 101, bipolar plate 41 is positioned in contact with and along gas diffusion medium 23 (with membrane 31 facing towards medium 23 and sheet 39 facing away from medium 23), and sheet 40 is placed in contact with and along gas diffusion medium 21. In addition, electrochemical device 101 differs from electrochemical device 11 in that vacuum V of electrochemical device 11 is replaced with a water feed F in electrochemical device 101.

Although only one electrochemical cell is shown in device 101, it can readily be appreciated that a plurality of like cells could be arranged in a bipolar configuration. In this case, sheet 40 may be replaced with an additional bipolar plate 41.

Where, for example, electrochemical device 101 is to be used as a water electrolyzer, electrochemical device 101 may be used similarly in certain respects to conventional water electrolyzers, with evolved oxygen gas being removed from gas diffusion medium 21 through port 21-3 and with evolved hydrogen gas being removed from diffusion medium 23 through port 23-3. However, in contrast to conventional water electrolyzers, liquid water is inputted to fluid chamber 35 through port 35-1, said water thereafter diffusing across membrane 31 and being released to gas diffusion medium 21 in the vapor phase. (The water in chamber 35 also serves to cool electrochemical device 101.) In this manner, the amount of water that is present in gas diffusion medium 21 is capable of being regulated—primarily by a water gradient created by the consumption of water at anode 15.

As can be appreciated, because membrane 31 provides water vapor, as opposed to liquid water, to gas diffusion medium 21, the water supplied to chamber 35 may contain dissolved salts, which would otherwise need to be removed from the water if liquid water were to be supplied directly to the membrane electrode assembly 19. Consequently, if desired, water in the form of filtered seawater (filtered for large particulates) could be supplied to chamber 35.

Figure 6:
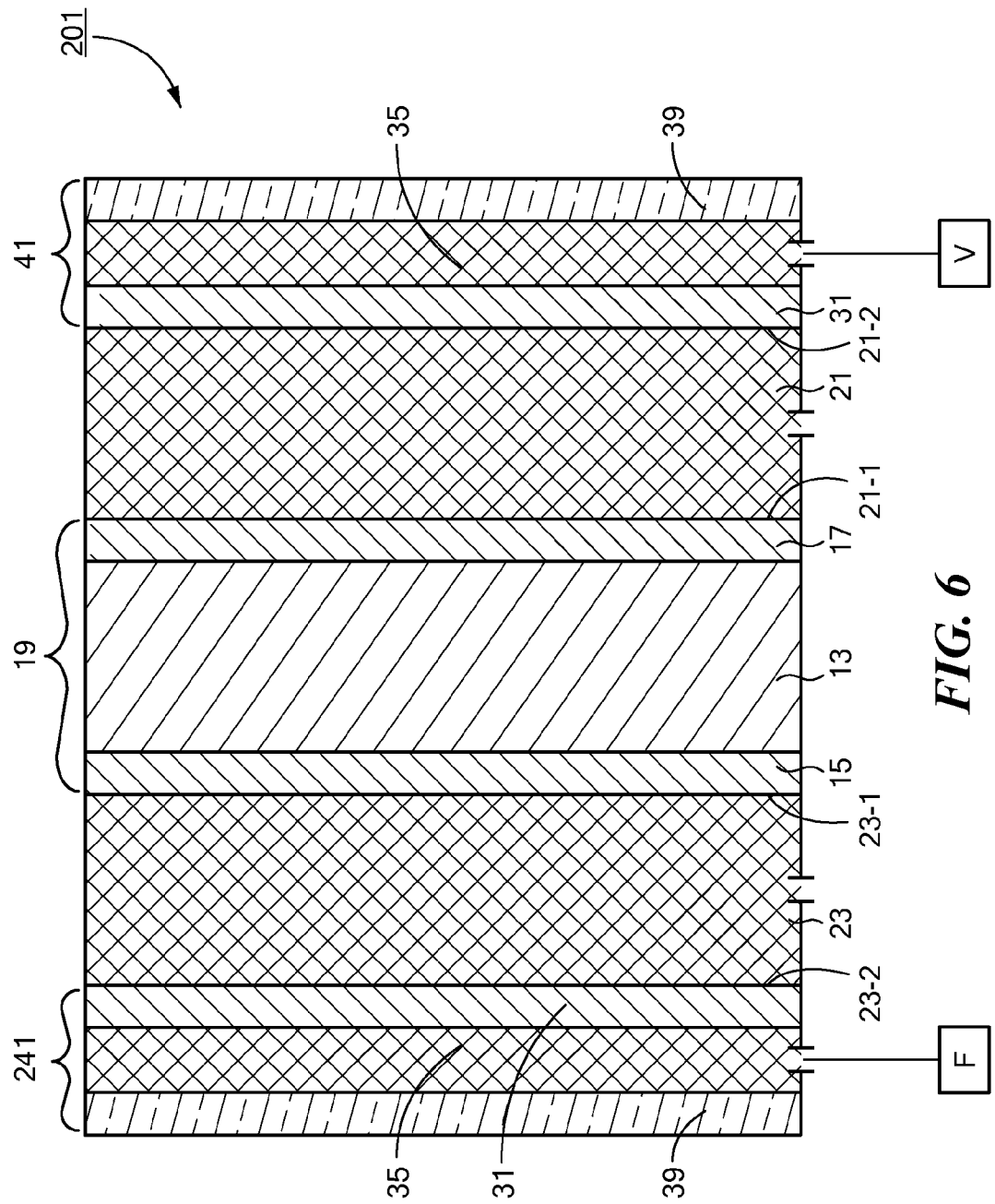
FIG. 6 is a schematic section view of a third embodiment of an electrochemical device constructed according to the teachings of the present invention.

Referring now to FIG. 6, there is schematically shown a section view of a third embodiment of an electrochemical device constructed according to the teachings of the present invention, the electrochemical device being represented generally by reference numeral 201.

Electrochemical device 201, which may be used, for example, as a unitized regenerative fuel cell or as a direct methanol fuel cell, may be similar in certain respects to electrochemical device 11. For example, similar to electrochemical device 11, electrochemical device 201 may comprise a membrane electrode assembly 19 that includes a polymer electrolyte membrane 13, an anode 15, and a cathode 17. In addition, similar to electrochemical device 11, electrochemical device 201 may comprise a gas diffusion medium 21 positioned in contact with and along cathode 17 and may comprise a gas diffusion medium 23 positioned in contact with and along anode 15. Moreover, similar to electrochemical device 11, electrochemical device 101 may include bipolar plate 41 positioned in contact with and along gas diffusion medium 21 (with membrane 31 facing towards medium 21 and sheet 39 facing away from medium 21) and a vacuum V coupled to fluid chamber 35. Electrochemical device 201 differs primarily from electrochemical device 11 in that, in electrochemical device 201, a bipolar plate 241, which is a mirror image of bipolar plate 41, is positioned in contact with and along gas diffusion medium 23 (with membrane 31 facing towards medium 23 and sheet 39 facing away from medium 23). In addition, a liquid feed F, which may be a water feed for an electrolyzer or a methanol feed for a direct methanol fuel cell, is coupled to fluid chamber 35 of bipolar plate 241.

Where electrochemical device 11 or 201 is used as a direct methanol fuel cell, the advantages over conventional direct methanol fuel cells are many. In a conventional direct methanol fuel cell, a weakly concentrated methanol solution (1 M to 3 M) is fed at the anode in excess stoichiometry. The $CO_2$ that is generated is evacuated from the cell with the excess methanol and must be separated from the methanol which is returned to the feed stock. The intimate contact with the MEA leads to large amounts of crossover of both methanol and water. Methanol crossover to the cathode is detrimental in two ways, first as a direct loss of fuel, secondly methanol at the cathode depolarizes the electrode by recombining with and removing oxygen from the catalyst surface. Water in the anode feed is also problematic as it crosses over the cathode by both diffusion and electroosmotic drag. This water can then flood the cathode catalyst, preventing oxygen from reaching the catalyst surface.

In the present invention, the methanol is fed as either a concentrated or neat methanol solution. Methanol transport then occurs through a methanol activity gradient through member 31 into the cavity of the anodic gas diffusion medium and to the anode surface. Manipulation of the composition and thickness of member 31 allows the rate of methanol crossover to be controlled to near the designed operating electrochemical consumption rate. This can greatly reduce the methanol crossover. Additionally, water can be placed in the cavity of the anodic gas diffusion medium with the methanol or in the cavity of the cathodic gas diffusion medium. The former approach, e.g., electrochemical device 11, has the advantage of cell build simplicity, with only one inner chamber. On the other hand, having water in a secondary chamber on the cathode side, e.g., electrochemical cell 201, allows neat methanol to be used as a fuel while greatly simplifying system operation in that both the methanol and water feeds could be dead-ended.

As can be seen from the above, the present invention allows for the introduction of products and/or the removal of reactants in electrochemical stacks in a planar fashion, directly at the site of the electrochemical reaction rather than utilizing a flow channel. This greatly simplifies many electrochemical stacks and systems using the same by (i) avoiding fouling of electrode catalyst surfaces by product; (ii) removing parasitic pumping losses associated with removing product from the stack; (iii) increasing reactant efficiency by limiting the amount of reactant to the electrode, thus reducing reactant loss through crossover; and (iv) allowing simpler downstream product handling by removal of unwanted species from the stack product outlet.

The present invention can greatly simplify "closed-loop" fuel cell/electrolyzer power systems as it eliminates the need for saturators and water/gas phase separation, which is particularly challenging in a zero gravity environment. In fuel cell mode, it allows for dead-ended gas feed for both $H_2$ and $O_2$, eliminating parasitic pumping losses that are generally required for water removal. Water removal by high recirculation rates also generally requires low pressure operation (high pressure gases simply cannot hold much water). An idealized unitized cell could, therefore, directly fill/use the fuel storage tanks in electrolyzer and fuel cell modes, respectively. Additionally, it eliminates the most difficult challenge of unitized systems, water management, while allowing the weight and volume savings of an entire second stack. Finally, as the electrolyzer is fed only water vapor, the requirements for water purity are relieved, and the MEA is protected from possible contaminants. This is particularly important when the feed for a water-fed electrolyzer contains ionic constituents, such as in salt-water applications for electrolysis.

Figure 7:
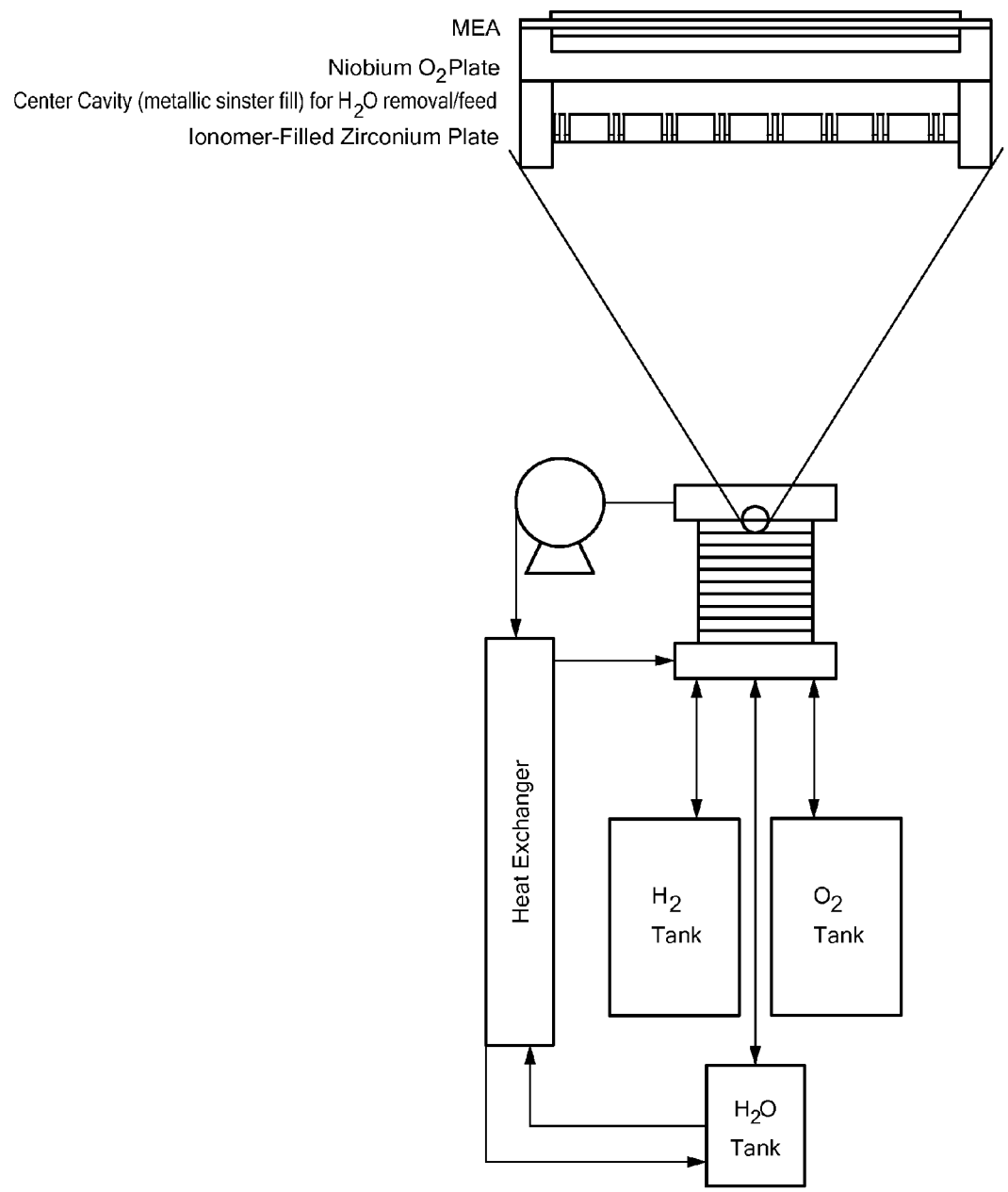
FIG. 7 is a schematic view of a unitized regenerative system that includes one embodiment of a bipolar plate constructed according to the teachings of the present invention.

The present invention provides a substantial system improvement compared to present alkaline systems, such as the space shuttle discrete alkaline fuel cell or systems that similarly control relative humidity by using porous bipolar plates, in that the present invention allows for simple high pressure operation with a high differential pressure. FIG. 7 shows a unitized regenerative system that includes the present invention.

The application of polymer electrolyte membrane fuel cells (PEMFC) that operate on pure $H_2/O_2$ reactants in closed systems is limited due to the difficulties in removing product water. Generally, it is necessary to flow one of the feed gases at great stoichiometric excess to remove product water from the flow channels, especially in high pressure $H_2/O_2$ systems where stoichiometric feed rates result in very low nominal flow velocities. Even when the water is removed with excess fuel, in a closed system, it is necessary to remove the liquid water from the excess feed before recycling the gases. The requisite pumping is a parasitic loss on the system efficiency and the liquid/gas separation is further complicated in a zero gravity environment, one of the key applications for PEMFC systems that operate on pure $O_2$. An $H_2/O_2$ PEMFC system that could operate with both reactant gases dead-ended and would not require gas/liquid separation would greatly enhance system efficiency and simplicity. A specific goal of the present invention is operation in a dead-ended $H_2/O_2$ fuel cell stack by removing water generated by the fuel cell reaction. That water is drawn through the selectively permeable membrane by vacuuming the inner chamber and maintaining a water vapor pressure below the dew point of the operating temperature of the MEA, thereby providing the necessary activity gradient.

In a conventional water electrolysis unit, distilled or deionized water is typically introduced into the anode cavity of an electrolysis cell where it is oxidized to oxygen with the concomitant production of protons. The protons are electrochemically transported across the electrolyte membrane, carrying three to four molecules of water per proton. This requires an elaborate water recovery and management system, which includes pumps, gas/water separators, filters, controls and container vessels. By bringing in the water in the vapor form, no liquid water is in the product streams. Additionally, as the liquid water feed is through the cavity and does not come into contact with the membrane electrode assembly, the purity requirement for the water is much lessened, allowing the direct use of tap or even seawater for electrolysis feed.

The following examples are provided for illustrative purposes only and are in no way intended to limit the scope of the present invention:

Example 1

An electrochemical device similar in structure to electrochemical device 11 was assembled. The electrochemical device included an electrically-conductive, chemically-inert, non-porous, selectively permeable membrane like membrane 31, the membrane consisting of a sheet of 50 wt % carbon black (Cabot Vulcan XC-72) and 50 wt % NAFION® 1100 equivalent weight perfluorinated sulfonic acid ionomer. The membrane electrode assembly included a NAFION® 117 membrane with each electrode consisting of 1 mg/cm² of NAFION ionomer and 2 mg/cm² of 46 wt % Pt on carbon (Tanaka). Hydrogen was dead-ended into the hydrogen chamber at 20 psig, and oxygen was dead-ended into the oxygen chamber at 20 psig. Toray HO60 carbon fiber paper was used for both the hydrogen and oxygen diffusion media, as well as for the structure corresponding to fluid chamber 35. This build was sandwiched between 50 cm² Fuel Cell test hardware (Fuel Cell Technologies). The fuel cell hardware was connected to an external load. 50 wt % sulfuric acid was passed through the center cavity at ~10 cc/min.

The temperature of the cell was controlled at 80° C. The load box controlled the system galvanostatically at 25 amps. The cell operated continuously for 95 hours without releasing any exhaust from the fuel chambers. Cell voltage was 640 mV±20 mV for the duration of the test.

Example 2

In the same setup described in Example 1, the sulfuric acid was removed, and a vacuum was applied to the inner cavity. The cell was also operated at 80° C., galvanostatically at 25 amps. The cell voltage was 620 mV±20 mV for the duration of the test. The cell operated 100 hours without releasing any exhaust from the fuel chambers.

Example 3

An electrochemical device similar in structure to electrochemical device 201 was assembled. The electrochemical device included an electrically-conductive, chemically-inert, non-porous, selectively permeable membrane like membrane 61, the membrane comprising a 5 mil thick titanium plate with 6 mil holes and 50% void volume. These holes were filled with 25 wt % carbon black (Cabot Vulcan XC-72) and 75 wt % NAFION® equivalent weight ionomer. The hydrogen chamber diffusion media was Toray HO60, and the oxygen chamber diffusion media was sintered titanium. The structure corresponding to fluid chamber 35 was sintered titanium. The structure corresponding to sheet 39 was a non-porous 5 mil titanium sheet. The membrane electrode assembly included a NAFION® 117 membrane with an oxygen electrode consisting of an 8 mg/cm² of 1:1:0.1 wt:wt:wt mixture of Pt Black (Aesar):Iridium black (Aesar):NAFION 1100 ionomer. The hydrogen electrode was 4 mg/cm² 1:0.1 wt:wt mixture of Pt Black:NAFION. The cell was operated at 80° C. in both fuel cell mode and electrolyzer mode.

Figure 8:
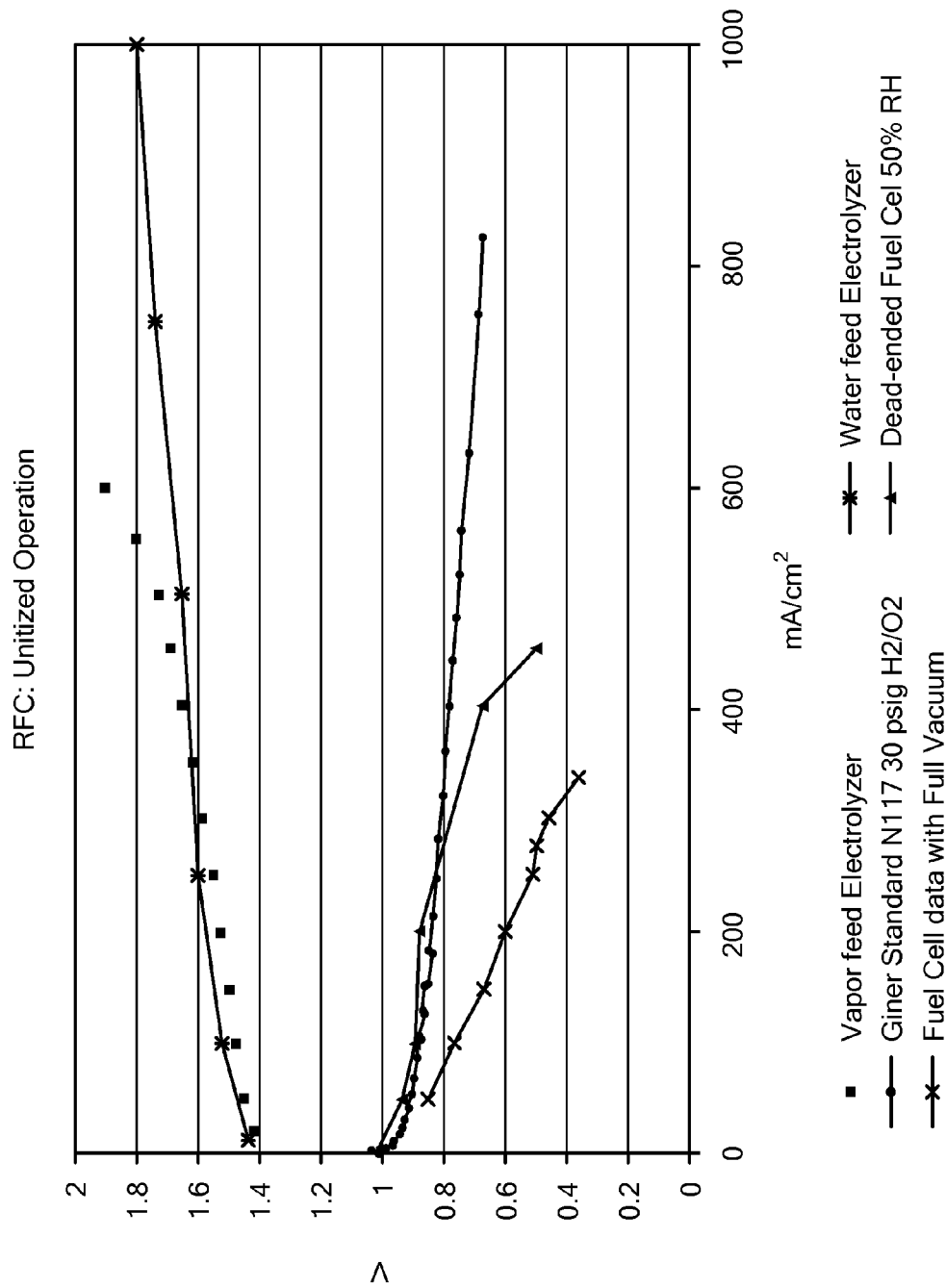
FIG. 8 is a graph depicting the results of the experiment discussed in Example 3.

In fuel cell mode, $H_2$ and $O_2$ were fed to the cell at 15 psig unhumidified. This build was sandwiched between 50 cm² Fuel Cell test hardware (Fuel Cell Technologies). The fuel cell hardware was connected to an external load. A vacuum was applied to the center chamber to less than 1 psig, as well as 3 psig. The cell was operated galvanostatically for 15 minutes, at which point the voltage was recorded, and the cell was taken to a higher current. The results are shown in FIG. 8 and compared to a standard $H_2/O_2$ fuel cell where the gas is recirculated at stoichiometric excess.

For electrolyzer operation, the cavity of the bipolar plate was filled with water and a power supply was connected to the cell. The electrolyzer was operated galvanostatically for 15 minutes, at which point the voltage was recorded. Additionally, water was brought into the oxygen chamber for comparison with a liquid feed electrolyzer. These results are shown in FIG. 8.

Example 4

Figure 9:
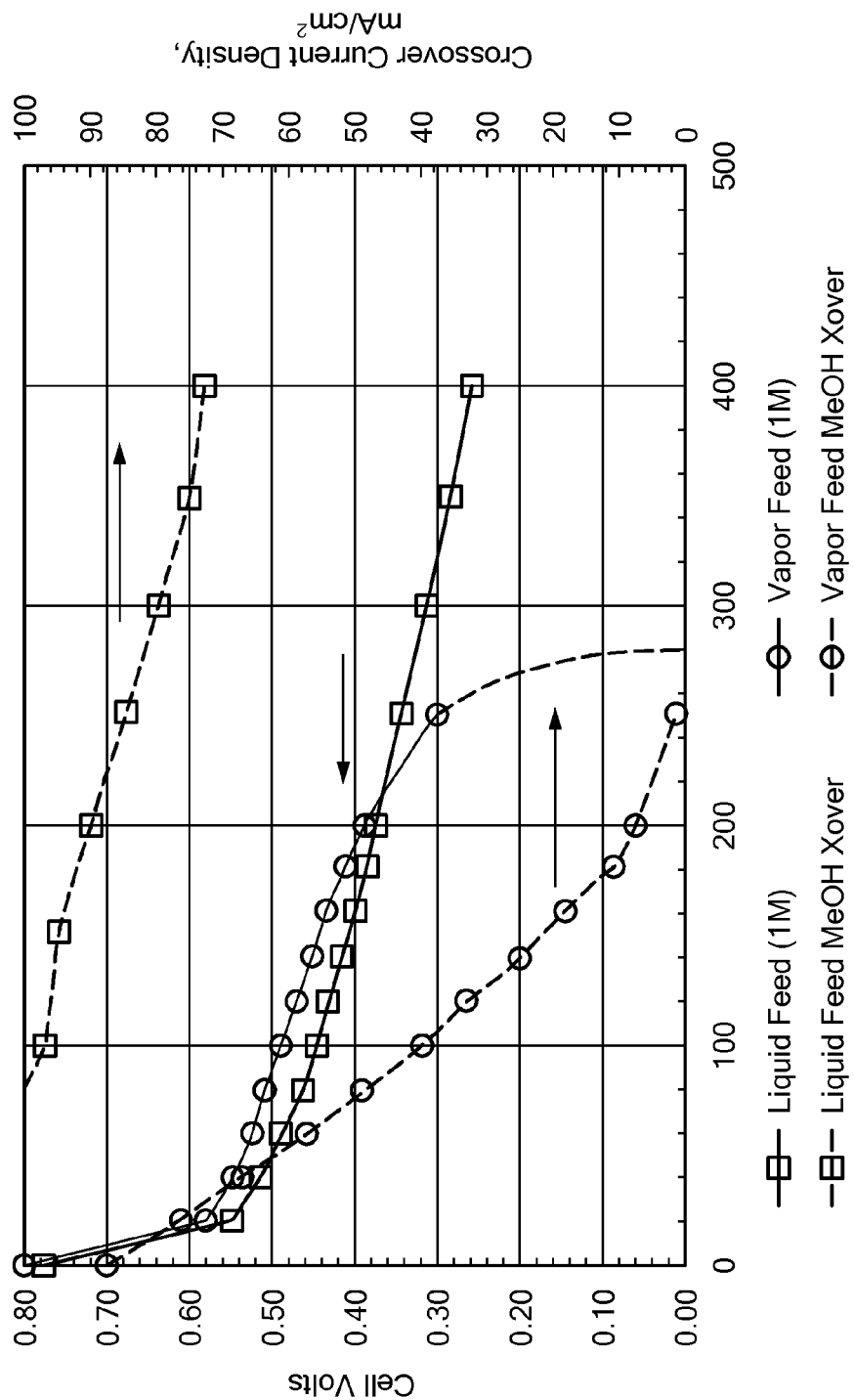
FIG. 9 is a graph depicting the results of the experiment discussed in Example 4.

An electrochemical device similar to that described in Example 3 was used for a vapor-feed direct methanol fuel cell, the device differing from that of Example 3 with respect to the membrane electrode assembly used. The membrane electrode assembly included a NAFION® 117 membrane with a methanol electrode consisting of 8 mg/cm² of 1:1:0.1 wt:wt:wt mixture of Pt Black (Aesar):Ruthenium black (Aesar):NAFION 1100 ionomer. The oxygen electrode was 4 mg/cm² 1:0.1 wt:wt mixture of Pt Black:NAFION. A 3 N methanol solution was circulated through the central cavity. The cell was operated at 60° C. The fuel cell hardware was connected to an external load. Air was passed through the oxygen electrode at a rate equal to two times the stoichiometric requirement. The cell was operated galvanostatically for 15 minutes, at which point the voltage was recorded, and the cell was taken to a higher current. The results are shown in FIG. 9. Additionally, the methanol was fed directly into the methanol chamber for direct comparison of a liquid-fed system.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. An electrochemical device comprising:
   (a) a polymer electrolyte membrane, said polymer electrolyte membrane having opposing first and second faces;
   (b) an anode electrically coupled to the first face of said polymer electrolyte membrane;
   (c) a cathode electrically coupled to the second face of said polymer electrolyte membrane;
   (d) an anodic gas diffusion medium defining an anode chamber in fluid communication with said anode;
   (e) a cathodic gas diffusion medium defining a cathode chamber in fluid communication with said cathode; and
   (f) a first electrically-conductive, chemically-inert, non-porous, liquid-permeable, substantially gas-impermeable membrane in contact with said anodic gas diffusion medium,
   wherein the first electrically-conductive, chemically-inert, non-porous, liquid-permeable, substantially gas-impermeable membrane comprises a solid polymer electrolyte and electrically-conductive particles.

2. The electrochemical device as claimed in claim 1 wherein the solid polymer electrolyte comprises a cation exchange ionomer membrane wherein the cation exchange group is selected from the group consisting of —SO$_3^-$, —SO$_2$NH$^+$, —PO$_3^{2-}$, and —CO$_2^-$.

3. The electrochemical device as claimed in claim 1 wherein the solid polymer electrolyte comprises an anion exchange ionomer membrane wherein the anion exchange group is —NH$_2^+$.

4. The electrochemical device as claimed in claim 1 wherein the solid polymer electrolyte is a perfluorosulfonic acid (PFSA).

5. The electrochemical device as claimed in claim 1 wherein the electrically-conductive particles are selected from the group consisting of carbon black, metal particles and supported metal particles.

6. The electrochemical device as claimed in claim 5 wherein the electrically-conductive particles consist of carbon black.

7. The electrochemical device as claimed in claim 5 wherein the electrically-conductive particles consist of metal particles.

8. The electrochemical device as claimed in claim 7 wherein the metal particles are selected from the group consisting of niobium particles, platinum particles, and titanium particles.

9. The electrochemical device as claimed in claim 1 wherein said first electrically-conductive, chemically-inert, non-porous, liquid-permeable, substantially gas-impermeable membrane consists of a sheet of the solid polymer electrolyte into which the electrically-conductive particles are dispersed.

10. The electrochemical device as claimed in claim 1 wherein said first electrically-conductive, chemically-inert, non-porous, liquid-permeable, substantially gas-impermeable membrane comprises a support having a plurality of pores, each of the pores being filled with the solid polymer electrolyte into which the electrically-conductive particles are dispersed.

11. The electrochemical device as claimed in claim 10 wherein the support is a metal sheet.

12. The electrochemical device as claimed in claim 10 wherein the support is a metallic sinter.

13. The electrochemical device as claimed in claim 10 wherein the support is a porous polymeric material.

14. The electrochemical device as claimed in claim 10 wherein said support has a first face and a second face and wherein said first electrically-conductive, chemically-inert, non-porous, liquid-permeable, substantially gas-impermeable membrane further comprises a first sheet positioned against said first face of said support and a second sheet positioned against said second face of said support, each of said first sheet and said second sheet comprising the solid polymer electrolyte into which the electrically-conductive particles are dispersed.

15. The electrochemical device as claimed in claim 1 wherein said first electrically-conductive, chemically-inert, non-porous, liquid-permeable, substantially gas-impermeable membrane comprises a sheet of the solid polymer electrolyte into which the electrically-conductive particles are dispersed and an electrically-conductive porous support, said sheet being supported by said electrically-conductive porous support.

16. The electrochemical device as claimed in claim 1 further comprising a first fluid chamber in contact with said first electrically-conductive, chemically-inert, non-porous, liquid-permeable, substantially gas-impermeable membrane opposite said anodic gas diffusion medium.

17. The electrochemical device as claimed in claim 16 further comprising a first electrically-conductive, non-porous sheet in contact with said first fluid chamber opposite said first electrically-conductive, chemically-inert, non-porous, liquid-permeable, substantially gas-impermeable membrane.

18. The electrochemical device as claimed in claim 1 further comprising a second electrically-conductive, chemically-inert, non-porous, liquid-permeable, substantially gas-impermeable membrane, said second electrically-conductive, chemically-inert, non-porous, liquid-permeable, substantially gas-impermeable membrane being in contact with said cathodic gas diffusion medium.

19. The electrochemical device as claimed in claim 18 further comprising a second fluid chamber in contact with said second electrically-conductive, chemically-inert, non-porous, liquid-permeable, substantially gas-impermeable membrane opposite said cathodic gas diffusion medium.

20. The electrochemical device as claimed in claim 19 further comprising a second electrically-conductive, non-porous sheet in contact with said second fluid chamber opposite said second electrically-conductive, chemically-inert, non-porous, liquid-permeable, substantially gas-impermeable membrane.

21. The electrochemical device as claimed in claim 20 further comprising at least one of a vacuum coupled directly to said second fluid chamber and a liquid feed coupled directly to said first fluid chamber.

22. The electrochemical device as claimed in claim 20 further comprising a vacuum coupled directly to said second fluid chamber and a liquid feed coupled directly to said first fluid chamber.

23. An electrochemical device stack comprising a plurality of the electrochemical devices of claim 1 arranged in a bipolar stack.

24. The electrochemical device as claimed in claim 1 wherein the electrochemical device is a fuel cell.

25. The electrochemical device as claimed in claim 1 wherein the electrochemical device is an electrolyzer.

26. An electrochemical device comprising: (a) a polymer electrolyte membrane, said polymer electrolyte membrane having opposing first and second faces; (b) an anode electrically coupled to the first face of said polymer electrolyte membrane; (c) a cathode electrically coupled to the second face of said polymer electrolyte membrane; (d) an anodic gas diffusion medium defining an anode chamber in fluid communication with said anode; (e) a cathodic gas diffusion medium defining a cathode chamber in fluid communication with said cathode; and (f) a first electrically-conductive, chemically-inert, non-porous, liquid-permeable, substantially gas-impermeable membrane in contact with said cathodic gas diffusion medium, wherein the first electrically-conductive, chemically-inert, non-porous, liquid-permeable, substantially gas-impermeable membrane comprises a solid polymer electrolyte and electrically-conductive particles.

27. The electrochemical device as claimed in claim 26 wherein the solid polymer electrolyte comprises a cation exchange ionomer membrane wherein the cation exchange group is selected from the group consisting of —SO$_3^-$, —SO$_2$NH$^+$, —PO$_3^{2-}$, and —CO$_2^-$.

28. The electrochemical device as claimed in claim 26 wherein the solid polymer electrolyte comprises an anion exchange ionomer membrane wherein the anion exchange group is —NH$_2^+$.

29. The electrochemical device as claimed in claim 26 wherein the solid polymer electrolyte is a perfluorosulfonic acid (PFSA).

30. The electrochemical device as claimed in claim 26 wherein the electrically-conductive particles are selected from the group consisting of carbon black, metal particles and supported metal particles.

31. The electrochemical device as claimed in claim 30 wherein the electrically-conductive particles consist of carbon black.

32. The electrochemical device as claimed in claim 31 wherein the electrically-conductive particles consist of metal particles.

33. The electrochemical device as claimed in claim 32 wherein the metal particles are selected from the group consisting of niobium particles, platinum particles, and titanium particles.

34. The electrochemical device as claimed in claim 26 wherein said first electrically-conductive, chemically-inert, non-porous, liquid-permeable, substantially gas-impermeable membrane consists of a sheet of the solid polymer electrolyte into which the electrically-conductive particles are dispersed.

35. The electrochemical device as claimed in claim 26 wherein said first electrically-conductive, chemically-inert, non-porous, liquid-permeable, substantially gas-impermeable membrane comprises a support having a plurality of pores, each of the pores being filled with the solid polymer electrolyte into which the electrically-conductive particles are dispersed.

36. The electrochemical device as claimed in claim 35 wherein the support is a metal sheet.

37. The electrochemical device as claimed in claim 35 wherein the support is a metallic sinter.

38. The electrochemical device as claimed in claim 35 wherein the support is a porous polymeric material.

39. The electrochemical device as claimed in claim 35 wherein said support has a first face and a second face and wherein said first electrically-conductive, chemically-inert, non-porous, liquid-permeable, substantially gas-impermeable membrane further comprises a first sheet positioned against said first face of said support and a second sheet positioned against said second face of said support, each of said first sheet and said second sheet comprising the solid polymer electrolyte into which the electrically-conductive particles are dispersed.

40. The electrochemical device as claimed in claim 26 wherein said first electrically-conductive, chemically-inert, non-porous, liquid-permeable, substantially gas-impermeable membrane comprises a sheet of the solid polymer electrolyte into which the electrically-conductive particles are dispersed and an electrically-conductive porous support, said sheet being supported by said electrically-conductive porous support.

41. The electrochemical device as claimed in claim 26 further comprising a first fluid chamber in contact with said first electrically-conductive, chemically-inert, non-porous, liquid-permeable, substantially gas-impermeable membrane opposite said cathodic gas diffusion medium.

42. The electrochemical device as claimed in claim 41 further comprising a first electrically-conductive, non-porous sheet in contact with said first fluid chamber opposite said first electrically-conductive, chemically-inert, non-porous, liquid-permeable, substantially gas-impermeable membrane.

43. The electrochemical device as claimed in claim 42 further comprising a vacuum coupled directly to said first fluid chamber.

44. An electrochemical device stack comprising a plurality of the electrochemical devices of claim 26 arranged in a bipolar stack.

45. The electrochemical device as claimed in claim 26 wherein the electrochemical device is a fuel cell.

46. The electrochemical device as claimed in claim 26 wherein the electrochemical device is an electrolyzer.

* * * * *